United States Patent [19]

Schomburg et al.

[11] Patent Number: 4,594,680
[45] Date of Patent: Jun. 10, 1986

[54] APPARATUS FOR PERFORMING QUADRATIC CONVERGENCE DIVISION IN A LARGE DATA PROCESSING SYSTEM

[75] Inventors: John R. Schomburg, New Brighton; Louis B. Bushard, Andover, both of Minn.

[73] Assignee: Sperry Corporation, New York, N.Y.

[21] Appl. No.: 491,520

[22] Filed: May 4, 1983

[51] Int. Cl.⁴ .................................................. G06F 7/52
[52] U.S. Cl. ...................................... 364/765; 364/757
[58] Field of Search ............... 364/761, 762, 764, 765, 364/766, 757, 758

[56] References Cited

U.S. PATENT DOCUMENTS

| | | | |
|---|---|---|---|
| 3,633,018 | 1/1972 | Ling | 364/765 |
| 3,670,956 | 6/1972 | Calhoun | 364/758 |
| 3,777,132 | 12/1973 | Bennett, Jr. | 364/765 |
| 3,828,175 | 8/1974 | Amdahl et al. | 364/765 |
| 4,374,427 | 2/1983 | Katayama | 364/761 |
| 4,414,642 | 11/1983 | Grube | 364/766 |
| 4,481,600 | 11/1984 | Asai | 364/765 |

OTHER PUBLICATIONS

Singh, "High Speed Array-Assisted Binary Decimal Divider", IBM Technical Disclosure Bulletin, vol. 20, No. 3, 1977.

Kaiser et al, "Digital Filters for High Speed Data Processing," Air Force Avionics Laboratory, Technical Report AFAL-TR-70-204, 1970.

Hill et al., *Introduction to Switching Theory and Logic Design*, John Wiley & Sons, New York, 1981.

Freiman et al, "Composite Division Unit," IBM Technical Disclosure Bulletin, vol. 9, No. 8, 1967.

*Primary Examiner*—David H. Malzahn
*Attorney, Agent, or Firm*—Charles A. Johnson; Kenneth T. Grace; Marshall M. Truex

[57] ABSTRACT

A binary division circuit for use in a large data processing system is disclosed which performs division with floating or fixed point numbers. It includes a multiplier unit which is modified to produce the higher precision calculation necessary to the division operation. This modification includes an augmented multiplier circuit which is combined with a quotient correction technique to provide a binary division circuit which produces identical quotients to those obtained by restoring or non-restoring divide techniques in less time than is required by other divide techniques.

11 Claims, 10 Drawing Figures

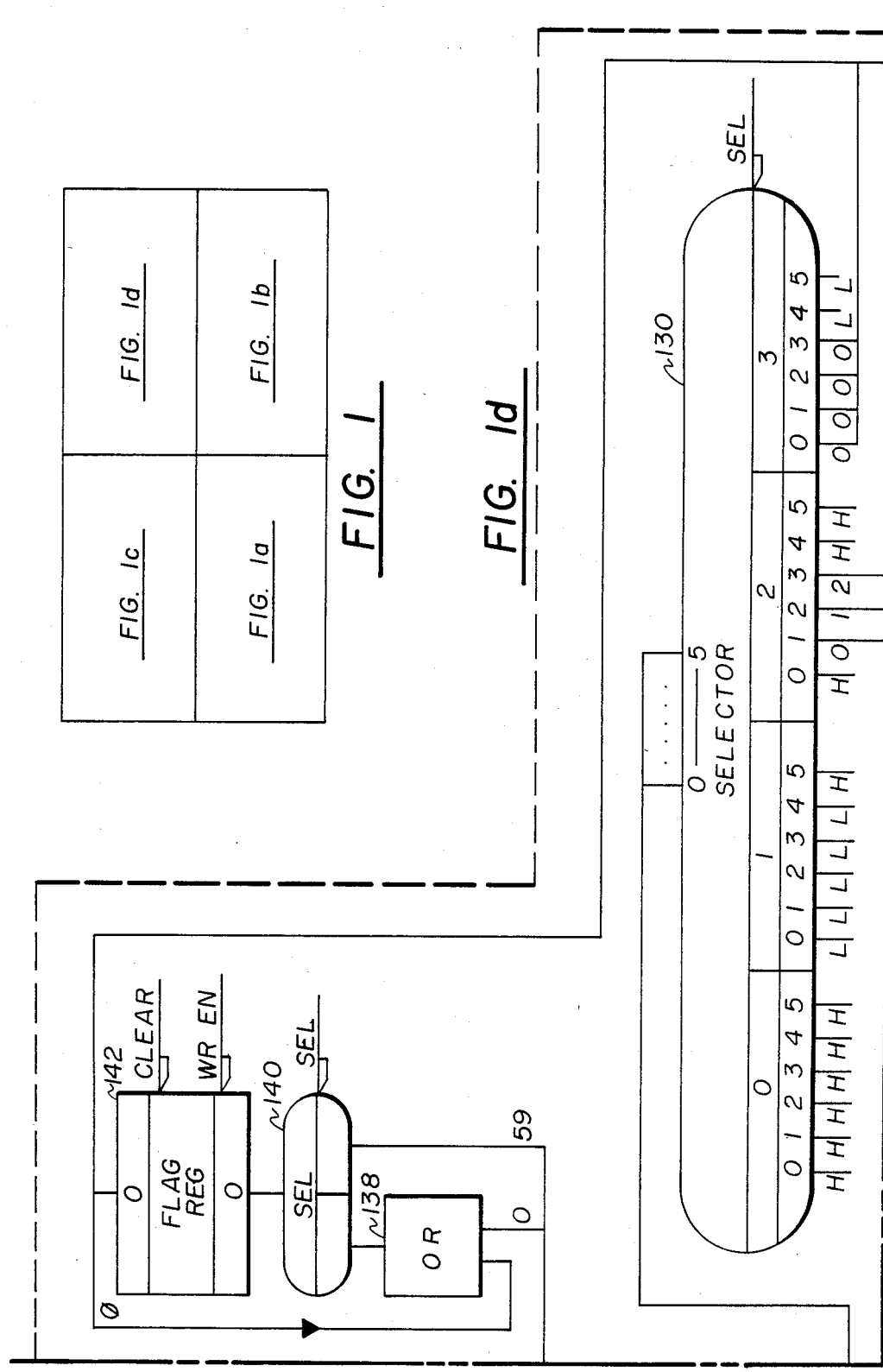

APPARATUS FOR PERFORMING QUADRATIC CONVERGENCE DIVISION IN A LARGE DATA PROCESSING SYSTEM

BACKGROUND OF THE INVENTION

A. Field of the Invention

This invention relates to a binary division circuit which performs division with floating point of fixed point numbers. In particular, a binary division circuit is disclosed which produces results that are compatible with current, as well as past, large scale data processing systems.

B. Prior Art

In the past, the division operation was most often performed in a digital data processing system using ordinary long hand division. That is, the division operation was accomplished by repetitively subtracting the divisor from the dividend until an insufficient quantity remains to perform another subtraction. The number of successful subtractions is, of course, the quotient. This method, along with a number of variations, comprise the general class of division methods known as subtractive divide methods. In particular, this method was used in the Control Data Corporation's Model 7600 Data Processing System and in the Sperry Corporation's Model 1108 Data Processing System.

There is another class of division methods coming into use in modern day data processing systems. This is the class of iterative divide methods. These iterative divide methods fall into two subclasses.

The first of this subclasses is known as the reciprocal method and utilizes a reciprocal unit. In this method an approximation of the reciprocal is computed by performing several special multiplication and subtraction operations. The result of that approximation is then multiplied by the dividend. This result is then an approximation of the quotient. The CRAY-1 Data Processing System has such a reciprocal unit in it.

In the second subclass of iterative division methods, the divisor is repetitively multiplied by a series of numbers. The product of this multiplication is a number that has the approximate value of one (1). The dividend is likewise multiplied by the same series of numbers and the product provides an approximation of the quotient. A variation of this method is used in the IBM Corporation's Model 360/91 Data Processing System.

These iterative division methods using the multiplication process came into use when fast multiplier circuits were initially developed. The iterative methods require special correction hardware in order to produce quotients that are compatible with quotients produced by the previously discussed subtractive division method. This fact is illustrated by two examples of these methods.

In the first example, three (3) is divided by three (3) using the reciprocal method. Long hand division, of course, gives an answer of one (1). However, the reciprocal of 3 is 0.3333 (to four decimal places). Multiplying 3 times 0.3333 gives a product of 0.9999, which is incorrect since it is less than 1.

In the second example, one-half ($\frac{1}{2}$) is divided by one-half ($\frac{1}{2}$) using the method described in the paper entitled "The IBM System/360 Model 91: Floating-Point Execution Unit", published in the IBM Technical Journal, January, 1967. In that method, both the dividend and the divisor are multiplied by the sequence $1+\frac{1}{2}$, $1+\frac{1}{4}$, $1+\frac{1}{8}$, $1+1/16$ ... etc. This operation produces products of $\frac{3}{4}$, 15/16, 63/64, ... etc. Each of these products is less than 1, while, of course, the quotient produced by long-hand division is one (1).

A further unique iterative approach is disclosed herein, in which a novel multiplier augmentation is combined with a new quotient correction technique.

BRIEF DESCRIPTION OF THE INVENTION

A. Objects

Accordingly, it is an object of the present invention to provide a binary division circuit which performs division with floating or fixed point numbers and produces results which are not only compatible with present day large scale data processing systems, but also compatible with long hand division.

It is another object of this invention to provide a binary division circuit which includes a multiplier unit as a major component of the divider, which multiplier is modified to allow the greater precision considered necessary for division.

It is still another object of this invention to provide a binary division circuit whose quotients are identical to those returned by a restoring or nonrestoring division technique, but which binary division circuit computes these quotients in less time than does the restoring and non-restoring division techniques.

It is still another object of this invention to provide a unique binary division circuit which includes the augmentation of a multiplier circuit within the modified multiplier unit.

It is also an object of this invention to provide a binary division circuit which includes a unique quotient correction system.

It is a still further object of this invention to provide a binary division circuit which utilizes an algorithm to perform division which algorithm is based on Newton's method for finding zeros of functions.

It is also an object of this invention to provide a binary division circuit which utilizes an algorithm to perform division which is based on Newton's method of finding zeros of functions and which algorithm comprises four steps, each of which steps may take one or more passes through the multiplier.

B. Summary of the Invention

A binary division circuit is disclosed for use in a large data processing system. The division circuit includes a modified multiplier unit which is capable of producing the greater precision necessary to the division operation. It also produces quotients which are not only identical to those returned by a restoring or non-restoring divide technique but which also can be computed in less time than these other techniques. Thus, a storage means is combined with a modified multiplier unit, which unit includes an augmented multiplier operating in conjunction with a quotient correction technique, to provide a unique iterative binary division circuit.

DETAILED DESCRIPTION OF THE INVENTION

Figure 1A:
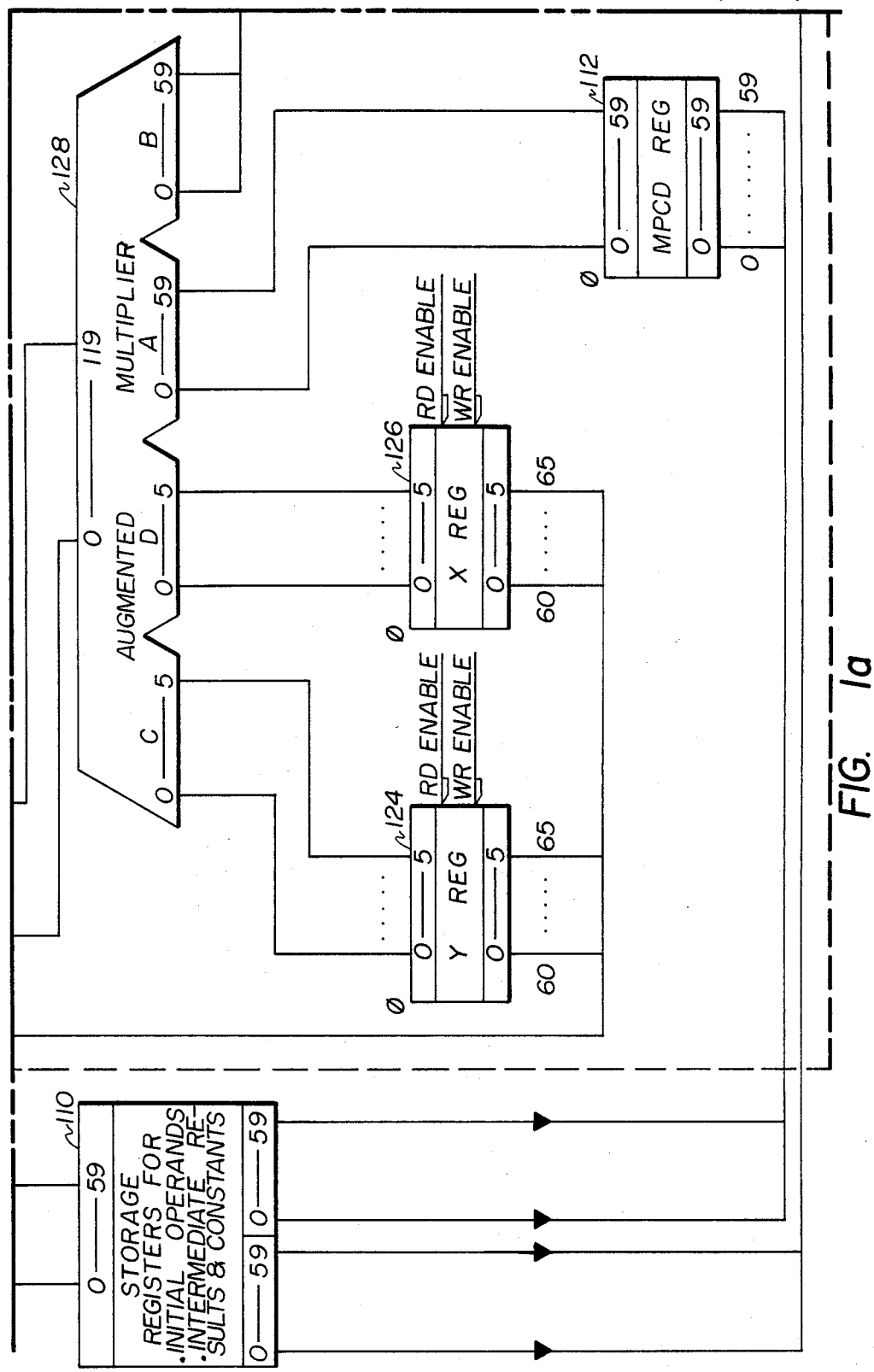
FIG. 1 includes FIGS. 1a, 1b, 1c and 1d positioned as shown, and illustrates a detailed block diagram of the division circuit for the division of 60-bit, unsigned, normalized binary fractions.
Figure 1B:
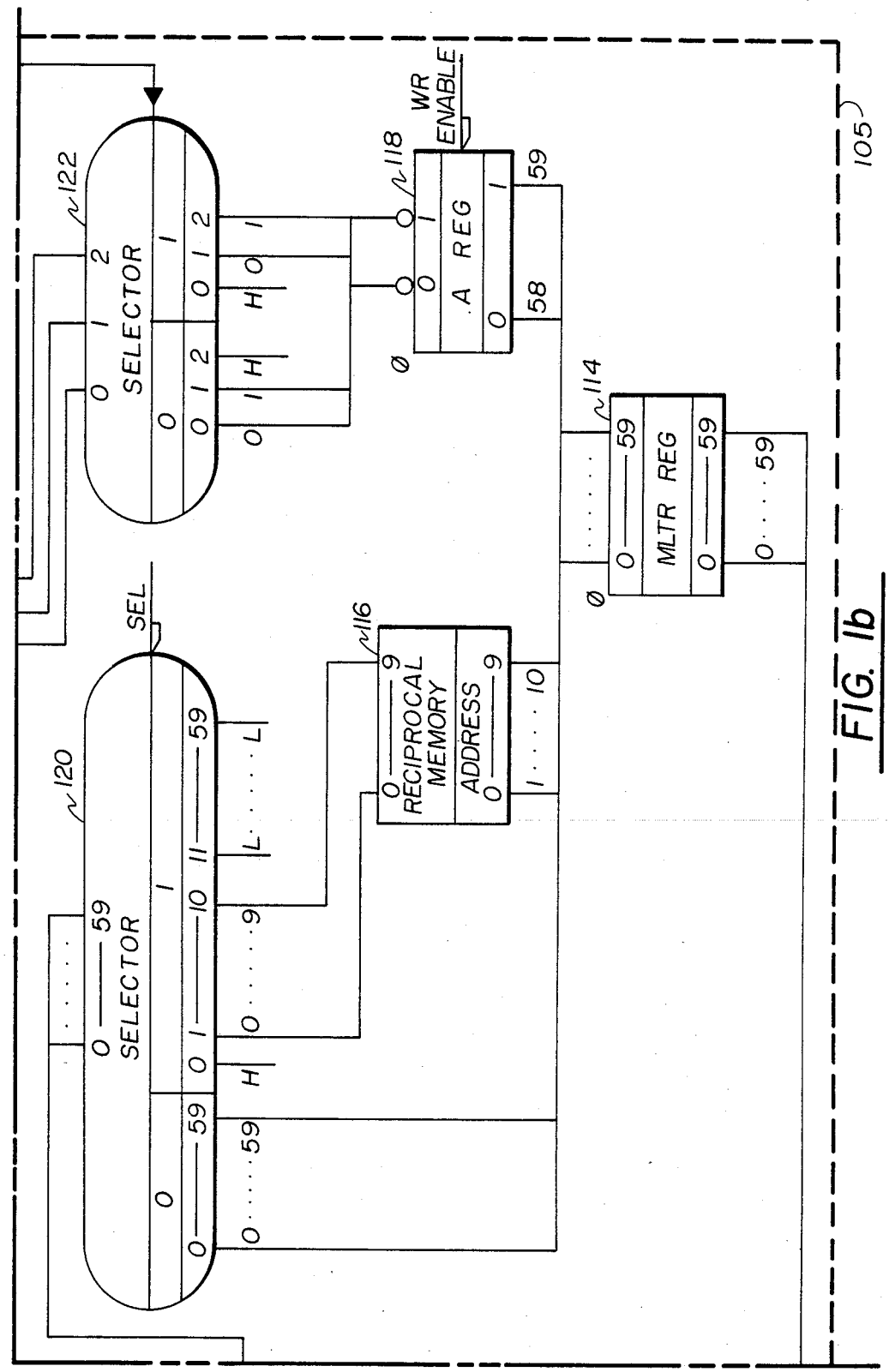
Figure 1C:
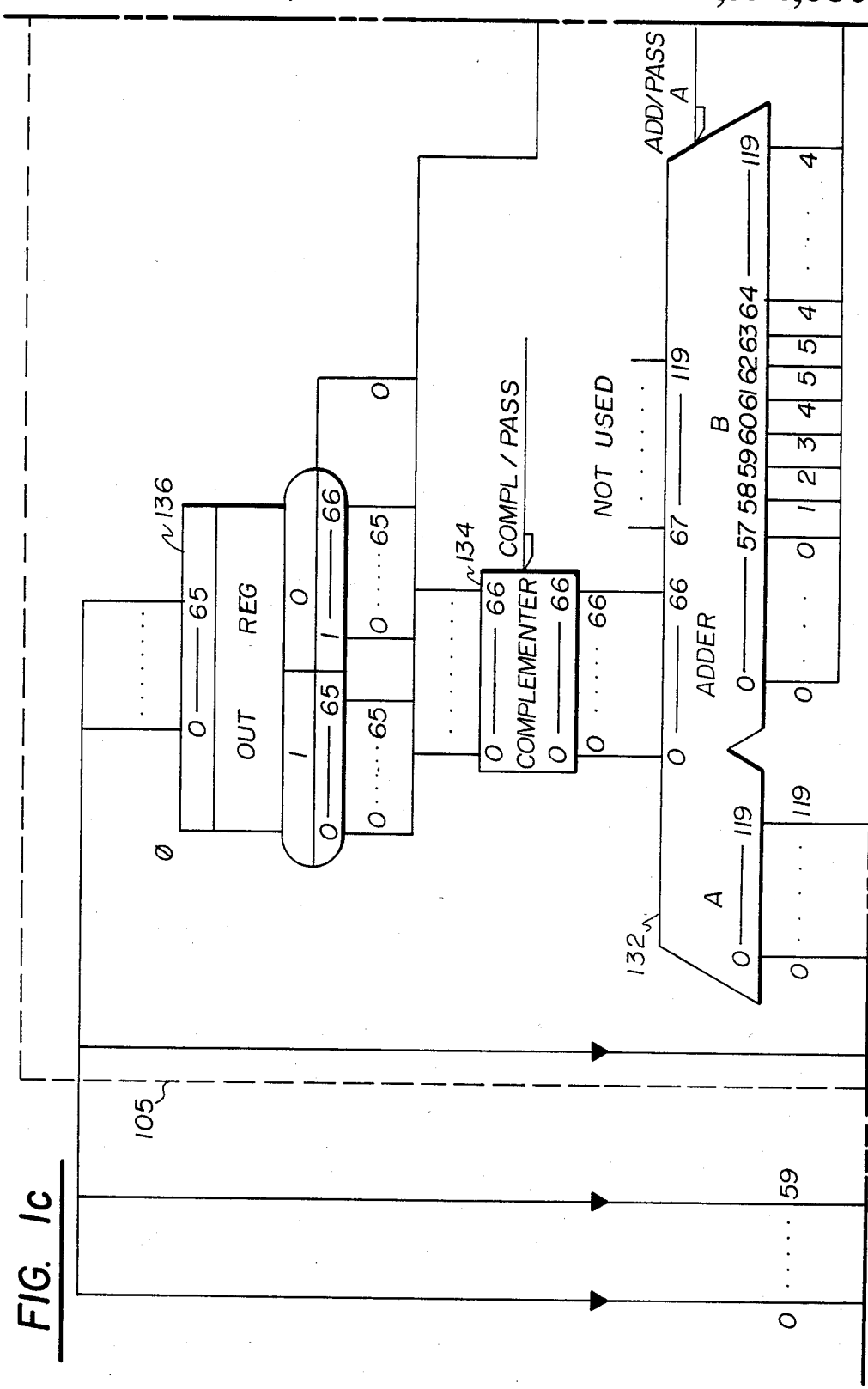

The division circuit shown in FIG. 1 consists of two major parts: Storage Registers 110 for the storage of the initial operands, intermediate results, and constants used during the division procedure; and a modified multiplication unit 105 comprising all other blocks in FIG. 1.

The Storage Registers 110 may comprise RAMs, Register Files, Registers or other such devices well-known in the art, and are shown with one input port and two output ports for the purpose of illustration and maximum performance.

The modified multiplication unit 105 as shown in FIG. 1, when used for ordinary multiplication, is designed to multiply 60-bit, unsigned, normalized binary fractions, and produce a result with the same characteristics. In this format an implied binary point is located to left of the 60-bit number strings, and the leftmost bit is always a 1, except in the case of zero which is represented by all 0's. The multiplication unit generates the complete 120-bit product internally, which is then normalized if necessary, and truncated to the most significant 60 bits. This implies that the output products are exact to 60 bits of precision, and are not approximations based on the input operands.

Before describing FIG. 1 in more detail, conventions used in the block diagram figures are summarized in this paragraph. The direction of data flow in the figures is from bottom to top, except where indicated with arrows. Blocks which are clocked have a $\phi$ symbol near their upper left corners. Individual bits of n-bit signals are numbered from left (most significant) to right as 0 to n−1. Positive logic is used throughout, so H (high) represents logical 1, L (low) represents logical 0, and X represents the don't care condition. A small circle at input or an output represents logical inversion. Control signals enter the right sides of the blocks. Those driven by external control logic (not shown) are indicated with half-arrows.

The procedure to perform iterative division using a division circuit as shown in FIG. 1 consists of four steps, each of which requires one or more passes through the multiplication unit. The first step may be derived using Newton's method and is well known in the art.

Recall that only N-bit unsigned normalized binary fractions are allowed as inputs to the multiplication unit, which produces outputs of the same form. Therefore, all intermediate results of the iterative divide procedure are of this form. When intermediate results fall outside of this range (e.g. $X(i) \geq 1$), this must be taken into account by using exponents or shift counts. This problem is dealt with later in the detailed descriptions of floating point and integer division. The four basic steps of the procedure are:

1. Reciprocal Generation

Given the divisor B, we wish to compute $X = 1/B$. The initial approximation to 1/B is found in the Reciprocal Memory 116:

$$X(0) = \text{Recip Mem}(B) \quad \text{(EQUATION 1)}$$

Then the following iterative method is applied until it can no longer provide further improvement in the reciprocal approximation:

$$Y(i) = 2 - B \cdot X(i) \quad \text{(EQUATION 2)}$$

$$X(i+1) = X(i) \cdot Y(i) \quad \text{(EQUATION 3)}$$

The result from equation 1 is used in equations 2 and 3 for $i = 0$. The number of times that these equations must be applied depends upon the fraction width N, and the Reciprocal Memory width I. Each application of these equations roughly doubles the accuracy of the reciprocal approximation.

2. Reciprocal Correction

Let $X(m)$ be the final reciprocal approximation. At this point, $1 \leq X(m) < 2$. $X(m)$ is corrected as follows:

$$X(m) = X(m) + 3 \cdot 2^{-N-2} \quad \text{(EQUATION 4)}$$

3. Quotient Generation

Given the dividend A, the approximation for the quotient A/B is computed as follows:

$$Q = A \cdot X(m) \quad \text{(EQUATION 5)}$$

4. Quotient Correction

At this point, the N-bit fraction representing Q is either correct or too large by $2^{-N}$. This may be determined by applying the following equation:

$$\text{FLAG} = A - B \cdot Q \quad \text{(EQUATION 6)}$$

If the resulting FLAG is negative, then the N-bit fraction representing Q is decremented by $2^{-N}$; if FLAG is positive or zero, then Q is correct:

If FLAG < 0 then     (EQUATION 7)

fraction (Q) = fraction (Q) $-2^{-N}$ else no more correction necessary.

Given that the dividend A, divisor B, and quotient Q are all N-bit fractions, then at least N+3 bits of each intermediate result must be retained and the multiplication unit must be capable of multiplying N+3 bit numbers in order for the procedure to work as described above. This may entail a substantial increase in the multiplier hardware over that required to multiply N-bit numbers. The best solution of this problem is to retain N+6 bits of each intermediate result and to employ the Augmented Multiplier 128 to approximate an N+3 bit multiplier to sufficient accuracy to allow the corrections in steps 2 and 4 to be effective.

Figure 2:
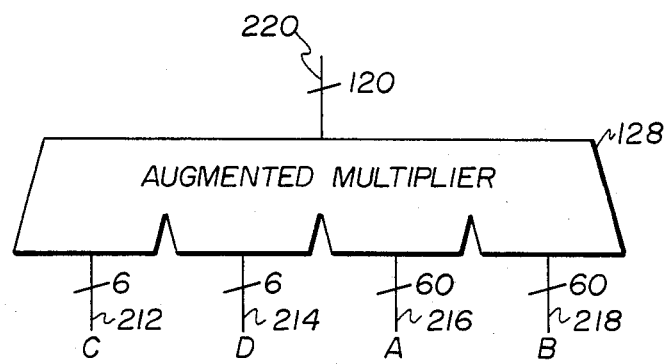
FIG. 2 shows the block diagram symbol for the augmented multiplier included in the logic block diagram of FIG. 1.
Figure 3:
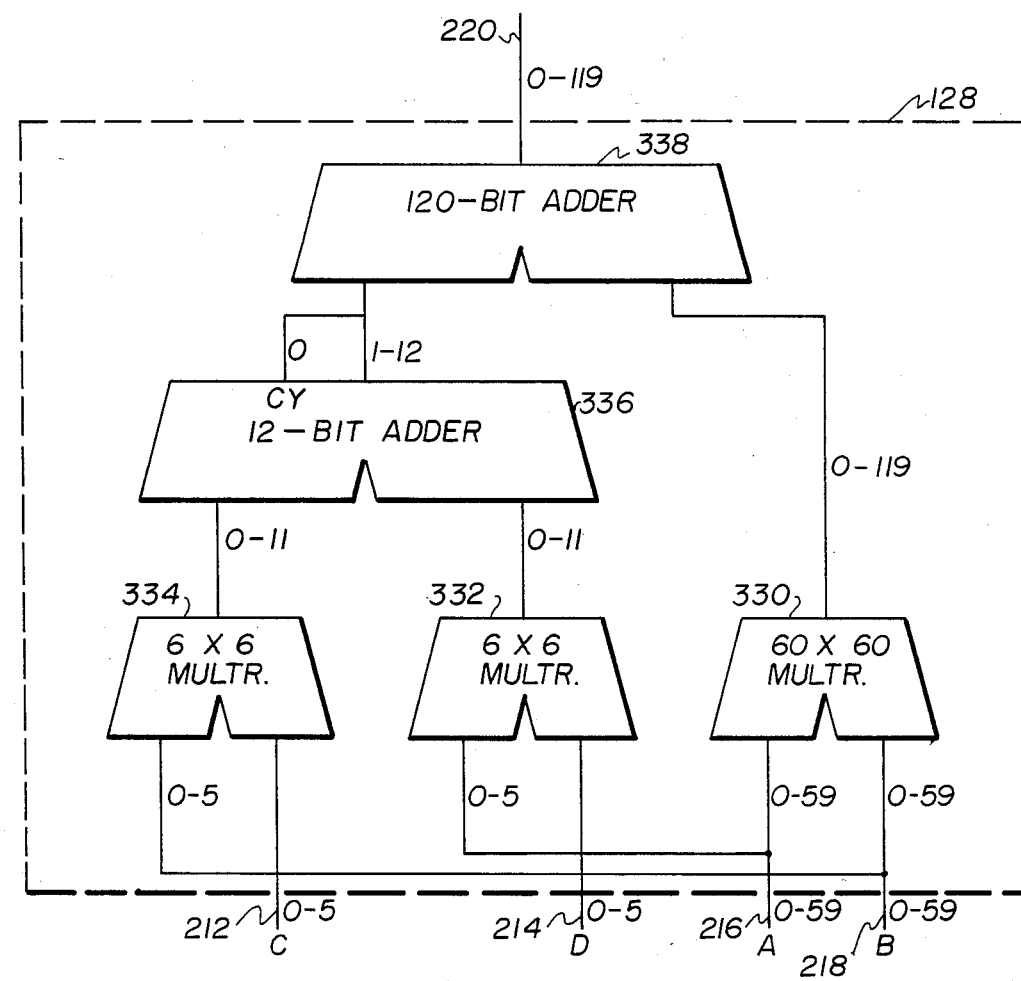
FIG. 3 illustrates the functional block diagram for the internal components of the augmented multiplier.
Figure 4:
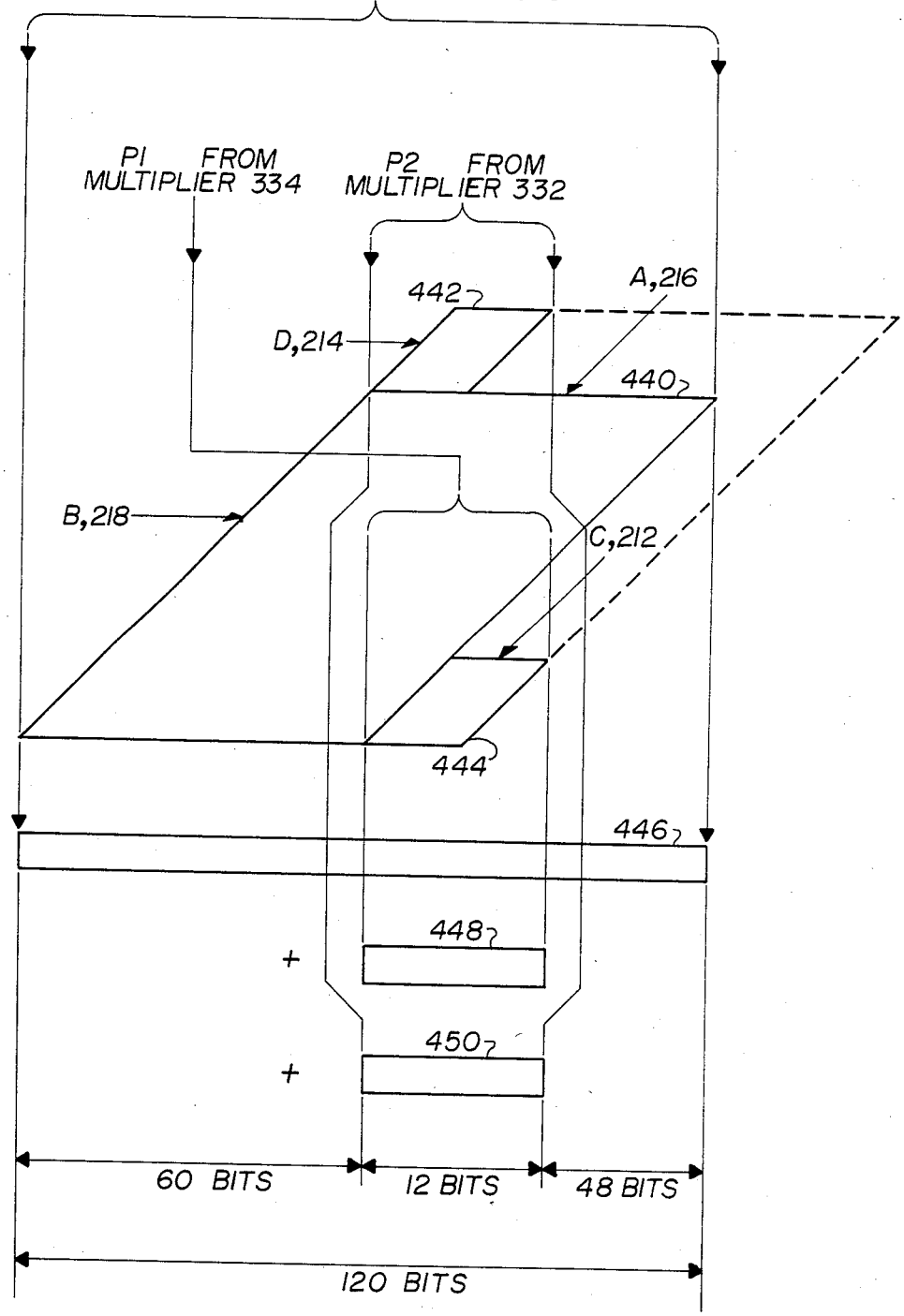
FIG. 4 illustrates the functional relationship and the proper alignment of results produced by the internal components of the augmented multiplier of FIG. 3 prior to summation.

FIG. 2 shows the block diagram symbol for the 60 by 60 bit Augmented Multiplier 128 as used in FIG. 1. FIG. 3 shows a possible implementation for this Augmented Multiplier 128. The 60×60 bit Multiplier 330 is a combinational multiplier which forms a 120-bit product which is then sent forward to a 120-bit Adder 338. This Multiplier 330 usually comprises the greater part of the multiplication unit, especially for large word width such as the width of 60 bits illustrated here. The 120-bit product from Multiplier 330 is augmented by adding the two 12-bit products from two 6×6 bit Multipliers 332, 334, using Adders 336 and 338. FIG. 4 illustrates how these three products are related. Let the large parallelogram 440 represent the parallelogram of partial products produced by the 60×60 bit Multiplier 330 before any addition of these partial products takes place. Likewise, the smaller parallelograms 442 and 444 represent the partial products produced by the 6×6 bit Multipliers 332 and 334, respectively. Let inputs A,216 and C,212 from FIG. 2 be concatenated to form a 66-bit multiplicand which would be copied into the rows of parallelogram of partial products for a 66×66 bit Multiplier. Let inputs B,218 and D,214 be likewise concatenated to form a 66-bit multiplier whose bits AND across the rows of partial products forming a parallelogram of logical products for a 66×66 bit Multiplier. The dashed lines in FIG. 4 indicate the outlines of such a 66×66 bit parallelogram of partial products. The portions of this parallelogram covered by the Augmented Multiplier 128 are indicated in FIG. 4 by 440, 442, and 444. In addition, the positioning of inputs A,216, B,218, C,212, and D,214 are also indicated in FIG. 4. In the lower portion of FIG. 4, the proper alignment prior to summation is given for the 120-bit products 446 produced by Multiplier 330 and the 12-bit products 448 and 450 produced by Multipliers 334 and 332 respectively.

The four steps to accomplish division will now be described in detail with reference to FIG. 1. The number representation to be used will be a floating point format which includes a characteristic or exponent field, a sign bit, and a 60-bit mantissa or fraction field. The fraction or mantissa is always in normalized form, as described earlier. Unless stated otherwise, the characteristics or exponents will be treated as follows: If the result fraction does not require a normalizing shift, the result characteristic or exponent will be the sum of the input characteristics or exponents, with any biases properly accounted for. If the result fraction does require a normalizing shift, the result exponent or characteristic will be that just described, minus one. The result sign bit will be positive if the sign bits of the inputs differ, and negative if the sign bits of the inputs are the same. A zero input may require other handling which will be mentioned later. FIG. 1 does not show any of the structures necessarily included to handle the characteristic or sign information, however, the methods described above are commonly used and well-known in the art. These data would be stored in an extension of the Storage Registers 110 which is also assumed but not shown. Only those structures for handling the 60-bit fractions are explicitly shown in FIG. 1.

To perform division upon numbers with 60-bits of precision using the structures shown in FIG. 1 requires ten separate passes through the multiplication unit. Recall that the multiplication unit 105 comprises all of the structures shown in FIG. 1 with the exception of the Storage Registers 110. A pass consists of the read of operands from the Storage Registers 110, the capture of these operands in the Multiplicand Register 112 and the Multiplier Register 114, the computation of the result in the remainder of the multiplication unit 105, which is captured in the Out Register 136, and the writing of the result into the Storage Registers 110. Each of these ten passes will now be described in detail.

PASS 1

The divisor operand B is read from the Storage Registers 110 to both the Multiplicand Register 112 and the Multiplier Register, 114. Then the bits 1 through 10 of the register 114 are applied to the address input of the Reciprocal Memory 116. Bit 0 is not applied since it is always assumed to be set. The Reciprocal Memory 116 is used to speed the convergence of X(i) in the later passes. Its optimal size is I-bits wide with an I-bit-wide address giving $2^I$ locations. In FIG. 1, I=10. It is treated as a dedicated read-only memory, and its contents may be computed in the following manner. The contents of location J are bits 1 through I of the fraction of the reciprocal of the number which has bit 0 set, bits 1 through I equal to J, and all other bits cleared to zeroes. This reciprocal is computed to at least I+1 bits of precision. The contents of location 0 of the Reciprocal Memory 116 are all 1 bits, which means that the reciprocal of 0.1 binary is taken to be 1.111111 . . . binary, which in normalized fraction form is 0.1111111 . . . binary.

Field 1 of Selector 120 is selected for application to the B-input of the Augmented Multiplier 128. This field consists of the fraction of the reciprocal of the divisor B approximated to a precision of 11 bits. This fraction is termed X(0) in Equation 1.

The read enables on the Y Reg 124 and the X Reg 126 are inactive during this pass so that zeroes are fed to the C and D inputs of the Augmented Multiplier 128, and therefore only the internal 60×60 bit Multiplier 330 will contribute. The A-input to the Augmented Multiplier 128 is always taken from the Mpcd Reg 112.

The output of the Augmented Multiplier 128 is the B·X(0) of Equation 2. This 120 bit output is fed to the A-input of Adder 132, also 120 bits wide. Field 0 of Selector 130 is selected and sent to the B-input of Adder 132. The output of Selector 130 in this case consists of all 1 bits. Adder 132 is instructed to add its A and B inputs, which effects a two's complement decrement of the 120-bit string from the output of the Augmented Multiplier 128. Then the output of Adder 132 is applied to the Complementer 134, where a one's complement operation is performed upon the Adder 132 output. The resulting output of the Complementer 134 is the fraction (not necessarily normalized) of 2−B·X(0) from Equation 2.

The Output Register 136 acomplishes normalization of the output of the Complementer 134 by selecting its input field 0 if the leftmost bit of the Complementer 134 output is 0. Otherwise the leftmost bit of the Complementer 134 output will always be set to 1, causing Output Register 136 input field 1 to be selected. During this pass the Flag Register is cleared. The purpose of this register will be explained during later passes when it is used. The output of the Output Register 136 is Y(0) from Equation 2, and bits 0–59 are written back to the Storage Registers 110 into a temporary location reserved for the Y(i) results. Out Reg bits 60 through 65, which are normally discarded, are written into the Y Reg 124 at this time, to be used in subsequent augmented multiplies to achieve the necessary result accuracy mentioned earlier.

During this pass, the result exponent or characteristic is computed in a different manner than that described earlier. The exponent or characteristic for the number in Multr Reg 114 is subtracted from that for the number in Mpcd Reg 112. If normalization takes place at Out Reg 136, then this difference, with any biases accounted for, is the exponent or characteristic of the result. If no normalization is necessary at Out Reg 136, then the exponent or characteristic of the result is that just described, plus 1.

PASS 2

Y(0) is read from the Storage Registers 110 and captured in the Mpcd Reg 112, and the divisor B is read and captured in the Multr Reg 114. The path through the Recip Mem 116 to Augmented Multiplier 128 input-B is taken as in pass 1. During this pass, the Y Reg 124 is read-enabled, thus bringing all of the 66 retained bits of Y(0) into the Augmented Multiplier 128. The Pass A function of Adder 132 and the Pass function of the Complementer 134 are invoked as in an ordinary multiplication, and Out Reg 136 functions as in pass 1. In this case the output result is X(1) from Equation 3. Bits 60-65 of Out Reg 136 are written into the X Reg 126, and bits 0-59 are written into a temporary location for X(i) in the Storage Registers 110. The exponents or characteristics are subtracted during this pass in the same manner as in pass 1. The resulting exponent or characteristic is that of the reciprocal approximations X(1) to the divisor B.

For all remaining passes, whenever X(i) or Y(i) are read from the Storage Registers 110 to be used as inputs to the multiplication unit 105, the corresponding X Reg 126 or Y Reg 124 is read-enabled to participate in the Augmented Multiplier 128 operation. Whenever X(i) or Y(i) is an output of the multiplication unit, bits 60-65 of the Output Register 136 are written into the corresponding X Reg 126 or Y Reg 124.

PASS 3

The divisor B and X(1) are read from the Storage Registers 110 and captured in the Mpcd Reg 112 and the Multr Reg 114 respectively. In this pass, and all subsequent passes, field 0 of Selector 120 is selected causing the Multr Reg 114 contents to be applied directly to the Augmented Multiplier 128. The functions of Selector 130, Adder 132, Complementer 134, and Out Reg 136 are identical to those in pass 1. The output result in Y(1).

PASS 4

Y(1) and X(1) are read from the Storage Registers 110 and captured in the Mpcd Reg 112 and Multr Reg 114 respectively. The functions of Selector 130, Adder 132, Complementer 134, and Out Reg 136 are identical to those in pass 2. The output result is X(2).

PASS 5

The divisor B and X(2) are read from the Storage Registers 110 and captured in the Mpcd Reg 112 and the Multr Reg 114 respectively. The operations during this pass are identical to those of pass 3. The output result is Y(2).

PASS 6

Y(2) and X(2) are read from the Storage Registers 110 and captured in the Mpcd Reg 112 and Multr Reg 114 respectively. The operations during this pass are identical to those of pass 4. The output result is X(3).

PASS 7

This pass is the Reciprocal Correction step indicated by Equation 4. In this pass, a constant with the value 1 is read into the Mpcd Reg 112 and X(3) is read into the Multr Reg 114. The constant of 1 has as its fractional part of the binary value 0.1 and has the proper characteristic or exponent such that its floating point value is unity. This constant may be stored in the Storage Registers 110 or generated at any point prior to the Augmented Multiplier 128.

Field 1 of Selector 130 is selected for application to Adder 132. The addition function of Adder 132 and the pass function of Complementer 134 are invoked. Field 0 of Selector 140 is selected and the Flag Reg 142 is write-enabled so that the Flag Reg 142 is set if no normalization of the output of the Complementer 134 is imminent at the Output Register 136. Recall that the Flag Reg 142 was initially cleared. The output result of Output Register 136 is written back to the Storage Registers 110 as the corrected X(3).

PASS 8

This pass is the Quotient Generation step described in Equation 5. The dividend A and the corrected X(3) are read from the Storage Registers 110 and captured in the Mpcd Reg 112 and the Multr Reg 114 respectively. The A Reg 118 is write-enabled so the bits 58 and 59 of the fraction of A are stored in it. The pass functions are invoked for Adder 132 and for Complementer 134. As in the previous pass, field 0 of Selector 140 is selected and the Flag Reg 142 is write-enabled so that the Flag Reg will be set if a normalization of the Complementer 134 output is not forthcoming. The function of the OR-gate 138 is to insure that if and only if a normalize shift of the output was not necessary in either of Passes 7 or 8, the Flag Reg 142 would be set. The output result from Output Register 136, Q, is written to the Storage Registers 110.

PASS 9

This pass implements the first portion of the Quotient Correction step, given by Equation 6. The quotient Q and the divisor B are read from the Storage Registers 110 and captured in the Mpcd Reg 112 and the Multr Reg 114 respectively. The contents of these registers are applied to the Augmented Multiplier 128 to form the B·Q of Equation 6. The one's complemented value of the least two significant bits of the dividend A, after proper alignment, is added to the output of the Augmented Multiplier 128 by Adder 132. This is done as follows.

The outputs of the A Reg 118, which are inverted, are applied to the data inputs of Selector 122. The output of the Flag Reg 142 is applied to the select control input of Selector 122, so that if the Flag Reg is set, field 1 of Selector 122 is selected. The output of Selector 122 is applied to field 2 of Selector 130, which is selected during this pass. The Flag Reg 142 indicates normalzation information for Passes 7 and 8, as described earlier. If the results of Passes 7 and 8 both required a normalization shift at the Output Register 136, then the characteristic or exponent of B·Q will be equal to that of the dividend A. Otherwise, the characteristic or exponent of B·Q will be one greater than that for A. It can be shown that one or the other of Passes 7 or 8 must normalize. Therefore the two bits of A may be aligned with B·Q by using a shift of at most one bit position. This shift is provided by Selector 122.

Because the values of A and B·Q are so close, only the least significant bit of A need participate in Equation 6 to determine the sign of the result. Two bits of A are retained in FIG. 1 so that same bit of A−B·Q may be tested even if the least significant bit of A was right-shifted for alignment with B·Q.

The subtraction in Equation 6 is accomplished by adding the one's complement of the A bits to B·Q, and then taking the one's complement of the resulting sum. The addition is performed by Adder 132 and the complement is performed by Complementer 134. Any bits entering the B input of Adder 132 which did not originate from the A Reg 118 are set to 1's by the use of H inputs on Selectors 122 and 130, field 2.

Bit 59 of the Complementer 134 output is the sign bit of the result of the subtraction in Equation 6. Field 1 of Selector 149 is selected and the Flag Reg 142 is write-enabled so that this bit is stored into the Flag Reg. The output of the Output Register 136 is no longer needed and is not written back to the Storage Registers 110.

PASS 10

This pass implements the second part of step 4, given by Equation 7. The quotient Q and a constant of 1 are read into the Mpcd Reg 112 and the Multr Reg 114 respectively. The constant of 1 is the same as that used in Pass 7. The contents of the Mpcd Reg 112 and the Multr Reg 114 are applied to the Augmented Multiplier 128. Field 3 of Selector 130 is selected, which in effect fans out the bit stored in the Flag Reg 142 to bits 0 to 60 of the B input of Adder 132. This number is added to the output of the Augmented Multiplier 128, which is just the fraction of Q multiplied by 0.1 binary. Therefore, if the Flag Reg 142 is set, indicating that A<B·Q from the previous Pass, then the fraction of Q will be decremented by $2^{-60}$. If the Flag Reg 142 is clear, then the fraction of Q will be unaffected. The Complementer 134 passes the result on to the Output Register 136, where it may be normalized and then written to the Storage Registers 110 as the final quotient Q.

This concludes the detailed description of binary division using the structures of FIG. 1. The bit ranges in FIG. 1 may be changed to use the same general structures and procedures to perform binary division for any value of N. The number of passes is dependent upon the values of N and I. Passes 1 and 2 always begin the division, and passes of the same operations as in Passes 7, 8, 9 and 10 described above always end the division. In the description above, Passes 1-6 are equivalent to three repetitions of Equations 2 and 3 as described earlier. To determine the required number of repetitions, r, of Equations 2 and 3, and therefore the number of passes, the following equation may be used.

$$r \geq \text{Log}_2((N+4)/I) \quad \text{(EQUATION 8)}$$

The detection of arithmetic faults such as division by zero, and characteristic overflow and underflow will now be described. Detection of division by zero is quite simple, and may be done by detecting a result fraction of zero in any of Passes 1-7 described earlier, or by detecting that the fraction of the divisor B is zero in any pass where it is used. Structures to perform these operations will not be described further, and are not shown in FIG. 1.

Figure 5:
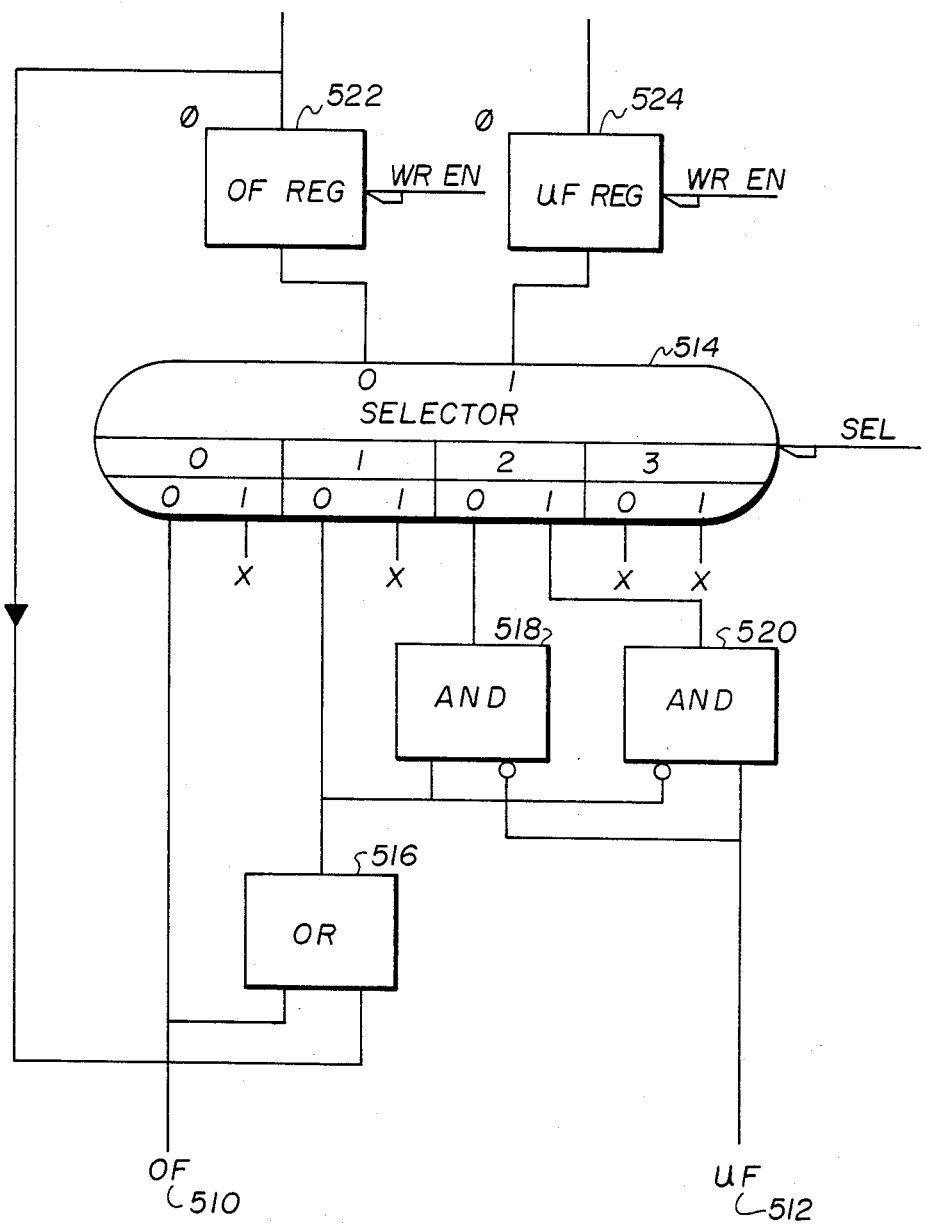
FIG. 5 shows the functional block diagram of the logic which is used in conjunction with the division circuit of FIG. 1 to detect characteristic overflows or underflows during the division of binary floating point numbers.

FIG. 5 illustrates structures which may be used to detect characteristic overflow or underflow for the final quotient as a function of overflows and underflows occurring during the various passes of the division operation. Let OF represent overflow, and UF represent underflow. In FIG. 5, OF 510 and UF 512 are the overflow and underflow indicators for the characteristic of the fraction which is selected at the Output Register 136. Recall that two characteristics are computed, one for the case of a normalize shift at the Output Register and the other if no normalize shift is necessary. Let the Pass numbers referred to here be the same as those used for the 10 pass division procedure previously described in conjunction with FIG. 1. Then, the OF and UF for the final quotient of Pass 10 may be computed as follows.

In Pass 2, field 0 of Selector 514 is selected and OF Reg 522 is write-enabled. In Pass 7, field 1 of Selector 514 is selected and OF Reg 522 is write-enabled. In Pass 8, field 2 of Selector 514 is selected and both OF Reg 522 and UF Reg 524 are write-enabled. In all other passes, OF 510 and UF 512 are ignored and the contents of OF Reg 522 and UF REG 524 are preserved. After Pass 8, the contents of OF Reg 522 and UF Reg 524 may be read and indicate a characteristic overflow and underflow in the final quotient Q. Boolean equations for the final overflow OF and underflow UF appear below. The notation OF(i) indicates the value of OF 510 for Pass i, and likewise for UF(i) and UF 512.

$$OF = (OF(2) + OF(7) + OF(8)) \cdot \overline{UF(8)} \quad \text{(EQUATION 9)}$$

$$UF = \overline{(OF(2) + OF(7) + OF(8))} \cdot UF(8) \quad \text{(EQUATION 10)}$$

For different values of N and I requiring different numbers of passes to accomplish the division, note that OF(i) and UF(i) are sampled only in Pass 2, the Reciprocal Correction step, and the Quotient Generation step.

Figure 6:
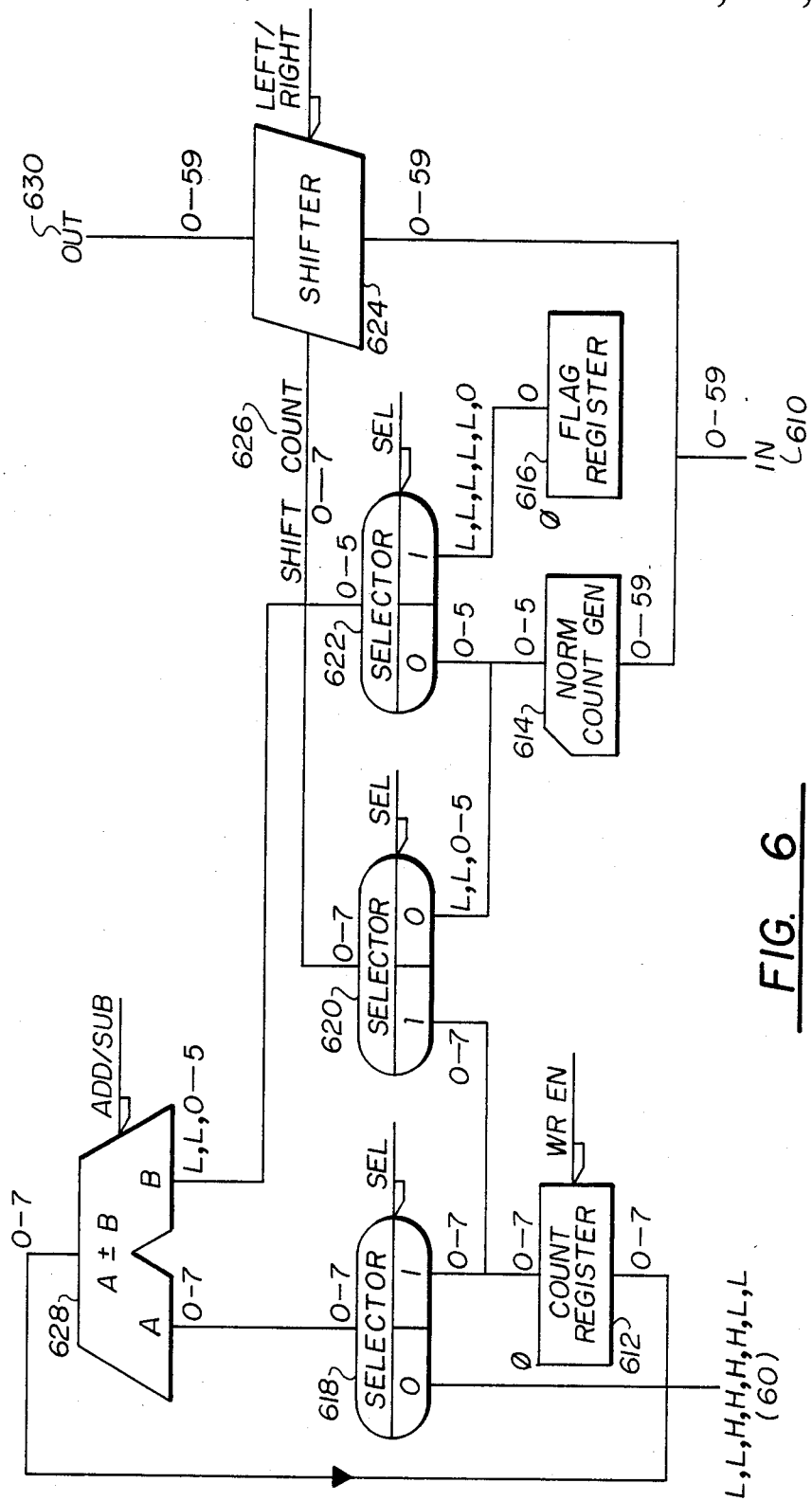
FIG. 6 shows the functional block diagram of the logic which is used in conjunction with the division circuit of FIG. 1 to support the division of 60-bit unsigned binary integer numbers.

FIG. 6 shows structures which may be used together with the structures in FIG. 1 to permit the division of 60-bit integers using the same technique as described earlier for floating point numbers. The Shifter 624 is used to convert the original integer dividend and divisor to binary fractions, and to convert the final quotient from binary fraction form to integer form. The shift counts replace the characteristics or exponents used with floating point numbers. It will be assumed that no room remains in the Storage Registers 110 for these shift counts, so separate storage is provided by the Count Reg 612. Two passes through the Shifter 624 are required to convert the dividend and divisor both to fractional form. Each of these passes will now be described in detail.

In the first pass, the integer divisor B is presented to input IN 610. This input is applied to both a Normalize Count Generator 614 and the Shifter 624. The Norm Count Gen 614 produces a normalize count whose value is equal to the number of left shifts required to normalize IN 610. This count may be between 0 and 59 inclusive. Inputs of zero will cause a final result of zero or division by zero and may safely produce an arbitrary normalize count. Field 0 for each of Selectors 618, 620, and 622 is selected, the Shifter 624 is in leftshift mode, Adder 628 is in subtract (A–B) mode, and Count Reg 612 is write-enabled. Therefore, the Shifter 624 will produce the normalized version of the divisor B on the output OUT 630, and Count Reg 612 will be loaded with the value 60 minus the normalize count of the divisor B.

In the second pass, the integer dividend A is presented to input IN 610. Field 1 of selector 618 is selected and the Adder 628 is in add mode during this pass. All other control signals are the same as for the first pass. Therefore the Shifter 624 produces the normalized version of the dividend A on output OUT 630 and the Count Reg 612 is loaded with its former value plus the shift count of the dividend A.

The normalized dividend and divisor may be stored into the Storage Registers 110 and used in the ten-pass division technique described in detail earlier. The Flag Reg 616 in FIG. 6 is the same register as the Flag Reg 142 shown in FIG. 1. During Pass 9, when it is used to align A with B·Q, it is also used to modify the Count Reg 612. At this time, fields 1 of Selectors 618 and 622 are selected, Adder 628 is in subtract mode and Count Reg 612 is write-enabled such that if the Flag Reg 616 is set, the Count Reg 612 will be loaded with its previous value minus 1. Otherwise the Count Reg 612 will retain its former value.

When the ten-pass division is completed, the final quotient Q, in normalized form, is read from the Storage Registers 110 and presented to the input IN 610. Field 1 of Selector 620 is selected and the Shifter 624 is in rightshift mode such that the final quotient Q is right shifted the number of bit positions indicated by the Count Reg 612. The result which appears at output terminal OUT 630 is the final integer quotient, which may be written into the Storage Registers 110. The smallest possible value for Count Reg 612 is 0 (60−59+0−1), resulting from a very large dividend and the smallest divisor (1), and the largest possible Count Reg value is 119 (60−0+59−0), resulting from the opposite divisor and dividend relationship. When the Shifter 624 is requested to right-shift a number by more than 60 positions, it produces zero.

As with the structures of FIG. 1, the structures of FIG. 6 may be generalized for any value of N. Where two temporary locations in the Storage Registers 110 were required for X(i) and Y(i) for floating point division, two more are required for integer division to hold the normalized versions of the divisor and the dividend, and three more passes are required to access the shifter for pre- and post-shifting of the operands and result.

The division circuit set forth in the preceding description is ideally suited to a pipelined application in which very much hardware is dedicated to a fast multiplier, and the ability to do division at a reasonable performance level with little hardware overhead is required. To take advantage of the pipeline concept, all of the registers in the various Figures of drawing may be thought to hold vectors of operands, rather than single scalar operands, with the exception of the Mpcd Reg 112, the Multr Reg 114, and the Out Reg 136 which are simple input and output registers in the main multiplication pipeline.

In actual application, many more clocking levels may be used than are shown in the figures of drawing, and the functions of the blocks shown may, of course, be combined without departing from the spirit of the basic invention.

It is intended that the foregoing description of the preferred embodiment is for purposes of illustration only and should not be construed in a limiting sense. The scope of this invention should be limited only by the language of the following claims.

What is claimed is:

1. An augmented multiplier for use in a binary division circuit of a large data processing system comprising:
   a 60×60 bit multiplier circuit connected to receive a first and a second input;
   a first 6×6 multiplier circuit connected to receive a third input and the second input of said 60×60 bit multiplier circuit;
   a second 6×6 multiplier circuit connected to receive a fourth input and the first input of said 60+60 bit multiplier circuit;
   a 12 bit adder circuit connected to both of said first and second 6×6 bit multiplier circuits to receive a first 12 bit signal from said first 6×6 bit multiplier circuit, and a second 12 bit signal from said second 6×6 bit multiplier circuit and to add together said first and second 12 bit signals and to provide a carry signal when one is produced by the addition of these two 12 bit signals; and
   a 120 bit adder circuit connected to said 12 bit adder circuit and to said 60×60 bit multiplier circuit to receive, and add together, the result of an addition of said first and second 12 bit signals, a carry signal, where one is produced, and the result produced by said 60×60 bit multiplier to provide a single output signal.

2. A method of modified multiplication used to perform division in a large data processing system, which method is based upon Newton's method of finding zeros of functions, comprising the steps of:
   (a) normalizing a received multiplier and a received multiplicand;
   (b) generating an approximate reciprocal of the received multiplier;
   (c) correcting said approximate reciprocal of the received multiplier;
   (d) applying the corrected approximate reciprocal of the received multiplier and the normalized received multiplicand to a multiplier means to produce an approximatized quotient; and
   (e) correcting said approximatized quotient to provide, as an output, a corrected quotient.

3. The method as set forth in claim 2 wherein step (b) of generating an approximate reciprocal of the received multiplier includes the further steps of looking up said reciprocal in a storage means, causing it to be issued, and applying the issued reciprocal to a selection means.

4. The method as set forth in claim 2 wherein said step of correcting said approximatized quotient includes the further step of applying the approximatized quotient to a complementer means.

5. An apparatus for performing quodratic convergence division by performing a fixed number of successive multiplication operations via multiple passes through said apparatus including a fixed number of correction steps to produce a quotient which is correct to a given precision of n bits comprising:
   (a) a storage register means for storing and providing as an output the n-bit fractions of initial operands, intermediate results and constants including the dividend A, divisor B, divisor reciprocal X, divisor reciprocal modifier 2-BX, quotient Q and a fractional form of unity;
(b) a multiplier register and a multiplicand register, each coupled to said storage register means;
(c) a reciprocal memory means coupled to said multiplier register capable of storing and providing as an output the i-bit truncated reciprocals to all possible i-bit divisors;
(d) a first selector means coupled to the reciprocal memory means and to said multiplier register for selection of the outputs therefrom;
(e) a first multiplication means connected to said multiplicand register and said first selector means and capable of receiving an n-bit multiplier from the first selector means, an n-bit multiplicand from the multiplicand register and producing a 2n-bit product;
(f) a second multiplication means connected to said first selector means and capable of receiving a 6-bit multiplier, 6-bit multiplicand, and producing a 12-bit product;
(g) a third multiplication means coupled to said multiplicand register capable of receiving a 6-bit multiplier, 6-bit multiplicand, and producing a 12-bit product;
(h) a first storage means coupled to said third multiplication means for providing 6 bits of the divisor reciprocal x;
(i) a second storage means coupled to said second multiplication means for providing 6 bits of the divisor reciprocal modifier 2-BX;
(j) a third storage means coupled to said multiplier register for providing 2 bits of the dividend A;
(k) a second selector means coupled to said third storage means for selection of a constant of all i bits, or a constant equal to $3 \times 2$ $(-n-2)$ or the 2 bits of the dividend retained in the third storage means, or a constant equal to the two's complement form of 2 $(-n)$ or a constant of zero;
(l) adder means coupled to the first, second and third multiplication means and also coupled to said second selector means for adding the 2n-bit product of the first multiplication means, the two 12-bit products of the second and third multiplication means and of the selected output of the second selector means;
(m) a complementor means coupled to said adder means for forming the one's complement received from the adder means;
(n) an output register coupled to said complementor means capable of passing or left-shifting by one bit position to normalize the output of the complementor means when necessary;
(o) a selective storage means coupled to said complementor means to selectively determine and store information indicative of the occurrence of normalization of the divisor reciprocal X or of the quotient Q in the output register in the successive pass prior to their respective correction steps through the apparatus; and
(p) a sign bit register for holding the sign obtained by subtracting BQ from A during the pass prior to the quotient correction step of the multiple successive operational passes through the apparatus.

6. The apparatus in claim 5 wherein:
(a) the reciprocal memory means includes additional address means for addressing of the i most significant bits exclusive of the most significant bit of the normalized divisor fraction B, and additional output means to provide as an output from said reciprocal memory means the i most significant bits exclusive of the most significant bit of the normalized reciprocal fraction 1/B;
(b) the additional output means of said reciprocal memory means includes further means for causing the most significant bit entering into the first selector to always be set to a binary 1; and
(c) means coupled to said reciprocal memory means for causing a normalized divisor B whose most significant i+1 bit reciprocal equal to 1.111 . . . binary when the reciprocal memory means output is selected for entry into the first selector means.

7. The apparatus in claim 5 wherein:
(a) the first storage means includes means for storing the 6 bits which immediately follow the first n bits of the divisor reciprocal fraction X after the divisor reciprocal fraction X has been normalized by the output register;
(b) the second storage means includes means for storing the 6 bits which immediately following the first n bits of the divisor reciprocal fraction 2-BX after the divisor reciprocal fraction 2-BX has been normalized by the output register; and
(c) the third storage means includes means for storing the 2 least significant bits of the dividend fraction A after the dividend fraction A has been normalized by the output register.

8. The apparatus in claim 5 wherein:
(a) the first and the third multiplication means each include a multiplicand input means, with the multiplicand input means for the third multiplication means coupled to the multiplicand input means of the first multiplication means to receive therefrom the 6 most significant bits of its multiplicand input;
(b) the third multiplication means includes a multiplier input means coupled to the first storage means to receive its multiplier input therefrom when the divisor reciprocal X is read from the storage register means, otherwise to receive a zero multiplier input;
(c) the first and the second multiplication means, each include a multiplier input means, with the multiplier input means of the second multiplication means coupled to the multiplier input means of the first multiplication means to receive therefrom the 6 most significant bits of its multiplicand input;
(d) the second multiplication means includes a multiplier input means coupled to the second storage means to receive its multiplier input therefrom when the divisor reciprocal modifier 2-BX is read from the storage register means, otherwise to receive a zero multiplicand input; and
(e) the first, the second and the third multiplication means each include an output means to provide a 2n-bit product from said first multiplier means, a 12 bit product from said second multiplier means and a 12 bit product from said third multiplier means with the two 12 bit products identically aligned to immediately follow the first n bits of the 2n-bit product of the first multiplication means sent to the adder means to thereby approximate an n+6 by n+6 multiplication means.

9. The apparatus in claim 5 wherein:
(a) the selected storage means includes means for selecting and storing the most significant bit of the corrected divisor reciprocal fraction as it is sent to the output register, and also means for logically ORing the most significant bit of the corrected divisor reciprocal fraction with the most significant bit of the uncorrected quotient fraction as it is sent to the output register;

(b) the sign bit register includes means for performing a quotient test of A−BQ and further means for storing the sign bit of said quotient test of A−BQ where BQ is formed by the first multiplication means and A is read from the third storage means and A is aligned with BQ in accordance with the normalization information read from the output register; and (c) means for causing the sign bit of the quotient test a −BQ to appear in the $2^{(-n)}$ bit position of said quotient test operation as determined by the bit locations of the BQ fraction.

10. The apparatus in claim 5 wherein:

(a) the complementor means includes means to produce the differences representing the divisor reciprocal 2−BX and the quotient test a −BX and the quotient test a −BQ;

(b) means for forming the two's complement of BX by adding the sum of all 1 bits to the output of the multiplier output BX using the adder means, including still further means for activating the complementor means; and (c) means for forming the two's complement difference of A−BQ using the adder means by adding the one's complemented value of a as aligned by the normalization information received from the output register with all other bit positions set to 1.

11. The apparatus in claim 5 including further means to cause the correction of the divisor reciprocal X to occur immediately before the formation of the initial quotient Q=AX, including means for adding $3\times2^{(-n-2)}$ to the divisor reciprocal where x is in the range of $2>x>=1$ and still further means for causing the correction of the quotient Q to occur immediately after the quotient test operation A−BQ including means for decrementing the quotient fraction by $2^{(-n-)}$ if the result of said quotient test operation A−BQ is less than zero otherwise passing the quotient fraction undecremented.

* * * * *